United States Patent
LeBaron et al.

(10) Patent No.: US 8,135,633 B1
(45) Date of Patent: Mar. 13, 2012

(54) SYSTEM AND METHOD FOR CHANGE MANAGEMENT AND TRANSACTION VERSIONING

(75) Inventors: Lynn D. LeBaron, Highland, UT (US); Jeffrey R. Mendonca, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 1462 days.

(21) Appl. No.: 11/446,641

(22) Filed: Jun. 5, 2006

(51) Int. Cl.
- *G07B 17/00* (2006.01)
- *G07F 19/00* (2006.01)
- *G07G 1/12* (2006.01)
- *G07G 5/00* (2006.01)
- *G06Q 40/00* (2012.01)

(52) U.S. Cl. ............ 705/30; 705/24; 705/35; 705/39

(58) Field of Classification Search ............ 705/30, 705/24, 35, 39
See application file for complete search history.

(56) References Cited

U.S. PATENT DOCUMENTS

| | | | |
|---|---|---|---|
| 4,642,767 A | 2/1987 | Lerner | |
| 5,117,356 A | 5/1992 | Marks | |
| 5,390,113 A | 2/1995 | Sampson | |
| 6,058,375 A * | 5/2000 | Park | 705/30 |
| 6,275,813 B1 | 8/2001 | Berka | |
| 2003/0033225 A1 | 2/2003 | Meldahl | |
| 2003/0065563 A1 * | 4/2003 | Elliott et al. | 705/14 |
| 2003/0182244 A1 | 9/2003 | Zucchetti | |
| 2005/0044015 A1 * | 2/2005 | Bracken et al. | 705/30 |
| 2005/0055289 A1 | 3/2005 | Mehldahl | |
| 2005/0216278 A1 * | 9/2005 | Eisen | 705/1 |
| 2005/0234786 A1 | 10/2005 | Aggarwal | |
| 2006/0149643 A1 * | 7/2006 | Reiner et al. | 705/30 |
| 2006/0161485 A1 * | 7/2006 | Meldahl | 705/35 |
| 2006/0179063 A1 * | 8/2006 | Rose et al. | 707/10 |
| 2006/0235773 A1 * | 10/2006 | Nelson et al. | 705/30 |

* cited by examiner

*Primary Examiner* — Ig T An
(74) *Attorney, Agent, or Firm* — Osha • Liang LLP

(57) ABSTRACT

An accounting tool may be used to manage financial data for an organization. The accounting tool may support the closing of accounting periods for the finances of the organization. The accounting tool may be configured to receive a request to modify a transaction of a closed accounting period. The accounting tool may be configured to create a changed version of the transaction according to the modify request, and to maintain a previous version of the transaction that does not include the requested modification. A separate transaction may not be required, even though the modified transaction was initially recorded during a closed accounting period. In addition, the accounting tool may be configured to provide a plurality of views of the closed accounting period, e.g., a first view that comprises the previous version of the transaction, and another view that comprises the changed version.

15 Claims, 8 Drawing Sheets

SYSTEM AND METHOD FOR CHANGE MANAGEMENT AND TRANSACTION VERSIONING

BACKGROUND

Traditionally, managing business finances and accounting has been a largely manual endeavor. In recent years, however, more and more organizations such as small businesses have begun to use software tools for finance management and accounting. Such tools are relatively inexpensive, typically run on relatively affordable computer systems, and provide intuitive, easy-to-use interfaces that do not require extensive software or financial expertise. The tools help to simplify and automate a variety of finance-related tasks, such as managing payrolls, sales and expenses, and paying bills. One of the key factors in the increasing popularity of such tools is their ease of use for the typical small business owner, who is able to perform the majority of finance management tasks using the tools with a minimum of training. Professionally trained accountants and/or other experts may of course still be retained by the small business owner to help with specific complex tasks, such as certain types of audits, preparation of tax returns, or when financial information of the small business is to be released externally, e.g., to investors, partners, or government agencies such as the Securities and Exchange Commission (S.E.C) in the United States. To perform the requested tasks, the professional accountants may also use interfaces provided by the software tools to access financial transaction records created and/or modified by the small business owners.

Unfortunately, in some cases, the requirements of traditional professional accounting techniques may potentially conflict with the desires of the vendors of software accounting tools to maximize the ease of use and flexibility of the tools for small business owners. For example, in traditional accounting, once the "books are closed" on a set of accounts of an organization (e.g., after financial data corresponding to a "closed" accounting period is released or published in some form outside the organization), transactions that correspond to the closed accounting period typically cannot be modified. In one exemplary scenario, if the last accounting period for a small business is closed on Dec. 31, 2005, and on Jan. 10, 2006, a mistake is discovered in an amount specified in a transaction of Dec. 20, 2005, traditional accounting techniques may require that the mistake can only be compensated or corrected by creating a separate transaction. For example, if the amount were incorrectly recorded as $200, when it should have been $250, a separate transaction with specifying the $50 difference may have to be recorded. However, such a requirement for a separate transaction may sometimes be confusing and/or difficult for small business owners. In addition, requiring such separate transactions for correcting errors may make it harder for the small business owners to understand or interpret any given transaction, since it may require some effort to find correcting transactions (if any exist) linked to the given transaction. At the same time, vendors of accounting tools may wish to ensure that experts who have to manage the accounting/legal impact of transaction changes do not face an undue burden in identifying changed transactions and taking any necessary actions, such as republishing a financial statement after a significant change to one or more transactions reflected in the financial statement is detected.

SUMMARY

Various embodiments of methods and systems for change management of accounting data are disclosed. According to one embodiment, a system comprises one or more processors and a memory storing program instructions executable by the processors to implement an accounting tool. The accounting tool may be used to manage financial data for an organization, including for example a plurality of transactions, each of which represents a respective financial operation of the organization. In some embodiments, the accounting tool may be configured to implement a general-purpose versioning capability, in which any change made to financial data and/or metadata maintained for the organization by the accounting tool results in a creation of a new version of one or more objects. The accounting tool may support the closing of accounting periods for the finances of the organization, for example, by an authorized user indicating a date (such as the end of a financial quarter or financial year) at which an accounting period for the organization is to be closed. In one embodiment, the closing date may differ from the current date: e.g., a user may indicate that the accounting period is to be closed as of a specified date in the past. The accounting tool may be configured to receive a request to modify a transaction of a closed accounting period. The request may be received, for example, via a simple, easy-to-use transaction view/edit interface that allows small business users to modify one or more attributes of a transaction in place, by simply replacing or overwriting the desired attribute values. The accounting tool may be configured to create a changed version of the transaction according to the modify request, and to maintain a previous version of the transaction that does not include the requested modification. A separate transaction may not be required, even though the modified transaction was initially recorded during a closed accounting period. In addition, the accounting tool may be configured to provide a plurality of views of the closed accounting period, e.g., a first view that comprises the previous version of the transaction, and another view that comprises the changed version. For example, an accountant or auditor may be permitted to view the original version as well as the changed version, so as to determine whether the requested modification was a material change that requires a financial statement released outside the organization to be republished. Thus the accounting tool may preserve the flexibility and ease of use desired by typical small business users (e.g., the ability to edit transactions in place), while at the same time allowing accountants to view all the data they may need to ensure that accounting and/or legal requirements are met. In some embodiments, the general purpose versioning capabilities of the accounting tool may be used to examine changes that were made at any specified point of time in the past—e.g., the examined changes may not necessarily correspond to a closed accounting period.

In one embodiment, the accounting tool may be configured to maintain change history information for each transaction, e.g., to record each of a series of changes made to the transaction over time, including the modified values of transaction attributes for each change, which user made the changes, and when the changes were made. In response to a change history request, the accounting tool may be configured to provide the recorded information for a plurality of the changes. In another embodiment, the accounting tool may be configured to support attribute-based querying related to transaction changes: e.g., to provide a report listing all the changes made to one or more transactions by a specified user or a specified group of users, or to provide a report listing all the transactions that belong to a specified category. The accounting tool may be configured to implement authorization-related functionality. For example, the types of views available to a particular user may be dependent on the access rights, roles or capabilities assigned to the user and/or permissions associated with various objects included in the financial data, and the accounting tool may be configured to verify that a user has the appropriate access rights or permissions before providing a report to the user.

A number of different reporting modes may be supported by accounting tool in some embodiments. For example, according to one reporting mode, only the latest version of a transaction may be provided, while according to another reporting mode, a version of transactions "as of" a specified date or time may be provided. In another embodiment, the accounting tool may be configured to store respective records corresponding to a variety of different types of accounting records, such as audits, reviews, reconciliations as well as closings, and to provide views that represent the state of the financial data as of the time when a specified accounting event was performed. In embodiments where general-purpose versioning is implemented, the accounting tool may, for example, allow an authorized user (such as an accountant, financial controller, auditor, or business owner) to generate reports detailing changes made during specified periods of time and affecting transactions corresponding to other specified periods of time. In one scenario, for example, a user may wish to review, in April 2006, any changes that are made during the month of January 2006 through March 2006, where the changes affected transactions representing financial operations performed during January 2005-December 2005.

Figure 1:
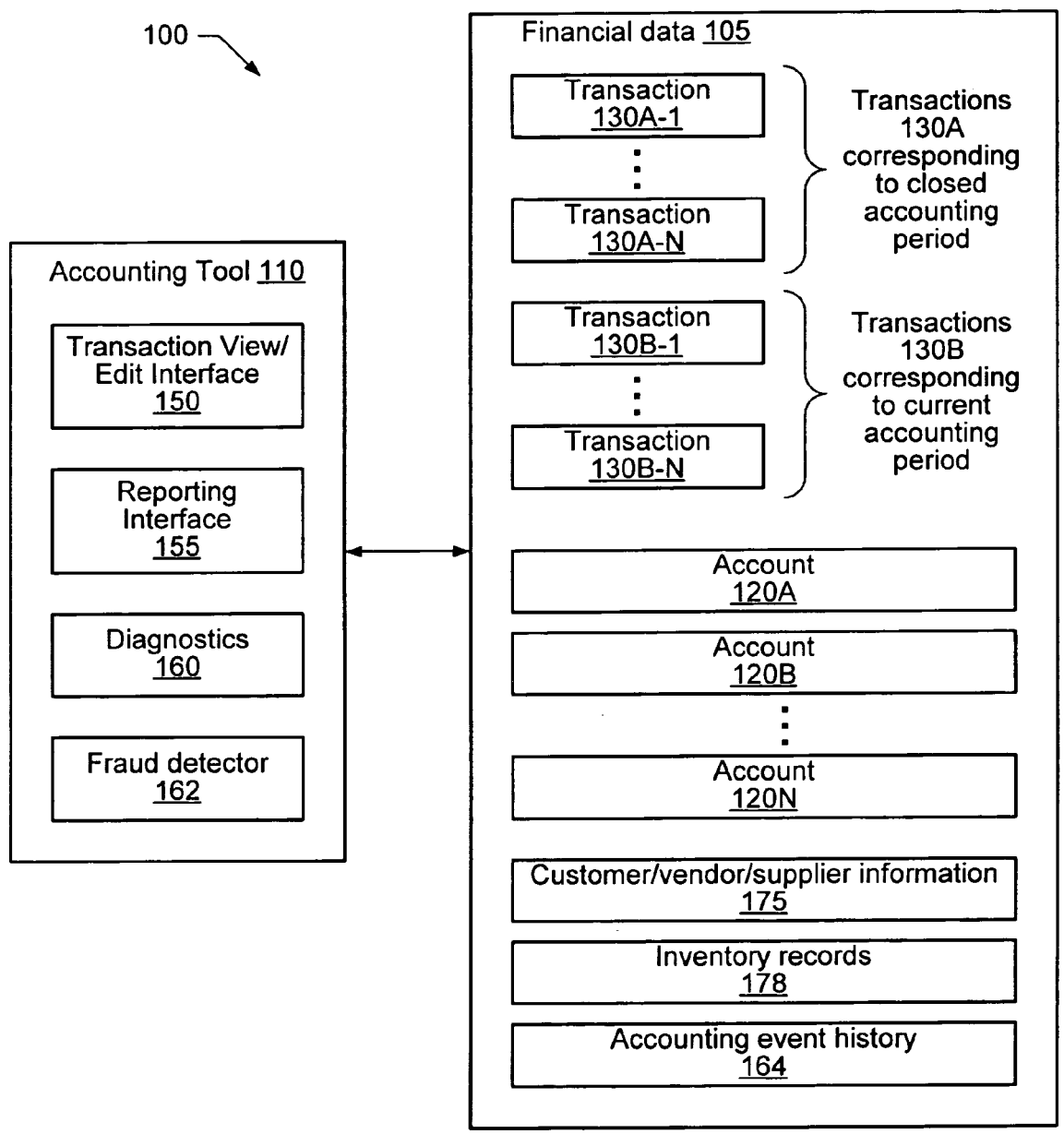
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 is a block diagram illustrating one embodiment of a system 100. The system includes financial data 105 for an organization such as a small business, and an accounting tool 110 configured to manage the financial data 105. In the embodiment shown in FIG. 1, the financial data includes a plurality of accounts 120 (e.g., 120A-120N) and a plurality of transactions 130 (e.g., transactions 130A-1-130A-N and transactions 130B-1-130B-N). The different accounts 120 may correspond to different aspects of the business whose finances are to be managed: e.g., account 120A may be set up for sales through one or more retail outlets and another account 120B may be set up for sales over the Internet. Each transaction 130 may record the occurrence of a financial operation of the organization, such as a check received for the sale of a product, a bill paid to a supplier, a loan payment and other similar operations. In some embodiments, each transaction 130 may comprise a plurality of line items, where each of the line items impacts a respective account 120 as a credit or a debit, and the sum of the line item amounts of a given transaction 130 is zero. For example, a given transaction 130 may debit $100 from account 120A and credit the $100 to account 120B. Some types of transactions may be logically linked to (and therefore impact) one or more specific accounts 120: e.g., in one implementation a transaction 130 representing an invoice may impact a corresponding "Accounts Receivable" account, and another transaction representing a bill may impact a corresponding "Accounts Receivable" account. In other embodiments, a given transaction may comprise only one line item and may impact only one account 120. It is noted that not all organizations may need to maintain multiple accounts 120; in some cases, a single account may suffice. In addition to transaction and account information, depending on the business needs of the organization, the financial data 105 may also include other types of information that may not specifically be related to transactions, such as customers, vendors or supplier information 175 (e.g., identification and contact information such as a company name, postal address, telephone/fax numbers, email address, current balance due, payroll and personal information on employees, product pricing data, service billing rates, sales tax information, fixed asset information, and/or any other information that may be needed by the organization to conduct business), and inventory records 178 for products provided by the organization.

The financial data 105 may also include an accounting event history 164, which may comprise records corresponding to accounting events such as audits, reconciliations, reviews and/or closings. For example, audits of the financial data 105 may be conducted periodically or in response to specific requests, and the accounting event history 164 may include a record of when the audits were performed. In another example, accounting periods for the financial data may be closed using accounting tool 110 for the end of a financial year, a calendar year, or at any desired points in time such as every three months, and the accounting event history 164 may include records indicating when each of a plurality of closings occurred. An accounting period may be closed, for example, when financial data 105 of an organization is to be released in some form outside the organization, e.g., in a filing with a government agency such as the S.E.C in the United States, or simply based on various accounting needs of the organization (e.g., based on the accounting practices followed within the organization). In some embodiments, accounting periods may be closed for arbitrary dates/times in the past—for example, in April 2006 the accounting period ending in December 2005 may be closed for an organization. By closing an accounting period, a user of accounting tool 110 may indicate a special status for the transactions that represent financial operations that occurred up to the time of closing: e.g., in some embodiments, a password may be required to modify such transactions (while modifying transactions corresponding to unclosed or "current" accounting periods may not require a password), or warnings may be displayed when such transactions are modified. In one embodiment, additions of transactions to closed accounting periods (which may occur as a result of changing a date field associated with an existing transaction, or as a result of actually inserting a new transaction), deletions of transactions from closed accounting periods (which may also occur as a result of a date change or an actual deletion), and/or modifications of transactions of closed accounting periods may each trigger "closing date exceptions" in the form of warnings or error messages. In some embodiments, instead of or in addition to including an accounting event history 164 that includes information on a variety of accounting event types, financial data 105 may include a "closing date" indicating a time or date when the most recent closing of an accounting period occurred. In some implementations, different closing dates may be supported for different sets of transactions 130 and/or accounts 120. It is noted that closing an accounting period may not be required in some embodiments—e.g., based on its needs, an organization may maintain all its transactions 130 in a current, unclosed accounting period.

In the depicted embodiment, transactions 130A (i.e., transactions 130A-1-130A-N) may correspond to a closed accounting period, while transactions 130B (i.e., 130B-1-130B-N) may correspond to an accounting period that has not yet been closed. The accounting tool 110 may be configured to receive a request to modify a transaction 130A of a closed accounting period. In response to the request, the accounting tool 110 may create a changed version of the transaction according to the request, while maintaining a previous version of the transaction that is not modified according to the request. Even though the requested modification is for a transaction of a closed accounting period, a separate transaction may not be required in the embodiment of FIG. 1. Accounting tool 110 may provide a simple, easy-to-use transaction viewing/editing interface 150, and a transaction 130A corresponding to a closed accounting period may be modified in place (e.g., by typing in a changed value for a transaction attribute in the same field within a display that shows the original value of the attribute) using such an interface 150 in some embodiments. From the point of view of a small business owner, the process of modifying a transaction 130A of a closed accounting period may thus be as simple as the process of modifying a transaction 130B of a current accounting period.

The accounting tool 110 may also be configured to provide a variety of views of the closed accounting period—e.g., one view may be provided that includes the changed version of the transaction 130A, and a different view may include the previous version of the transaction 130A in the embodiment of FIG. 1. For example, in one implementation a default view may include the changed version of the transaction 130A, while authorized users (such as accountants or auditors) may request a different, non-default view that includes the previous version. In the embodiment shown in FIG. 1, the accounting tool 110 may include a reporting interface 155 which may be used to request and/or display views of the closed accounting period (and/or other transactions 130 or accounts 120 of financial data 105). The reporting interface may support a variety of different reporting modes, where the reporting mode may specify which versions of transactions are to be included in the reports (e.g., whether only the latest version is to be included or whether the version as of a specified point in time is to be included), as described in further detail below. In some embodiments, the accounting tool 110 may also include one or more other components, such as a diagnostics facility 160 configured to detect accounting errors (e.g., where a transfer from one account to another is incorrectly recorded in either the source or destination account), and/or a fraud detector 162 configured to detect the probability of fraudulent operations (e.g., by detecting patterns of suspicious transactions based on various criteria). It is noted that not all of the components of accounting tool 110 shown in FIG. 1 may be included in some implementations. In some embodiments, a different component architecture than that shown in FIG. 1 may be used for accounting tool 110—e.g., a fraud detector 162 may be included as part of a diagnostic facility 160 in one embodiment.

Figure 2:
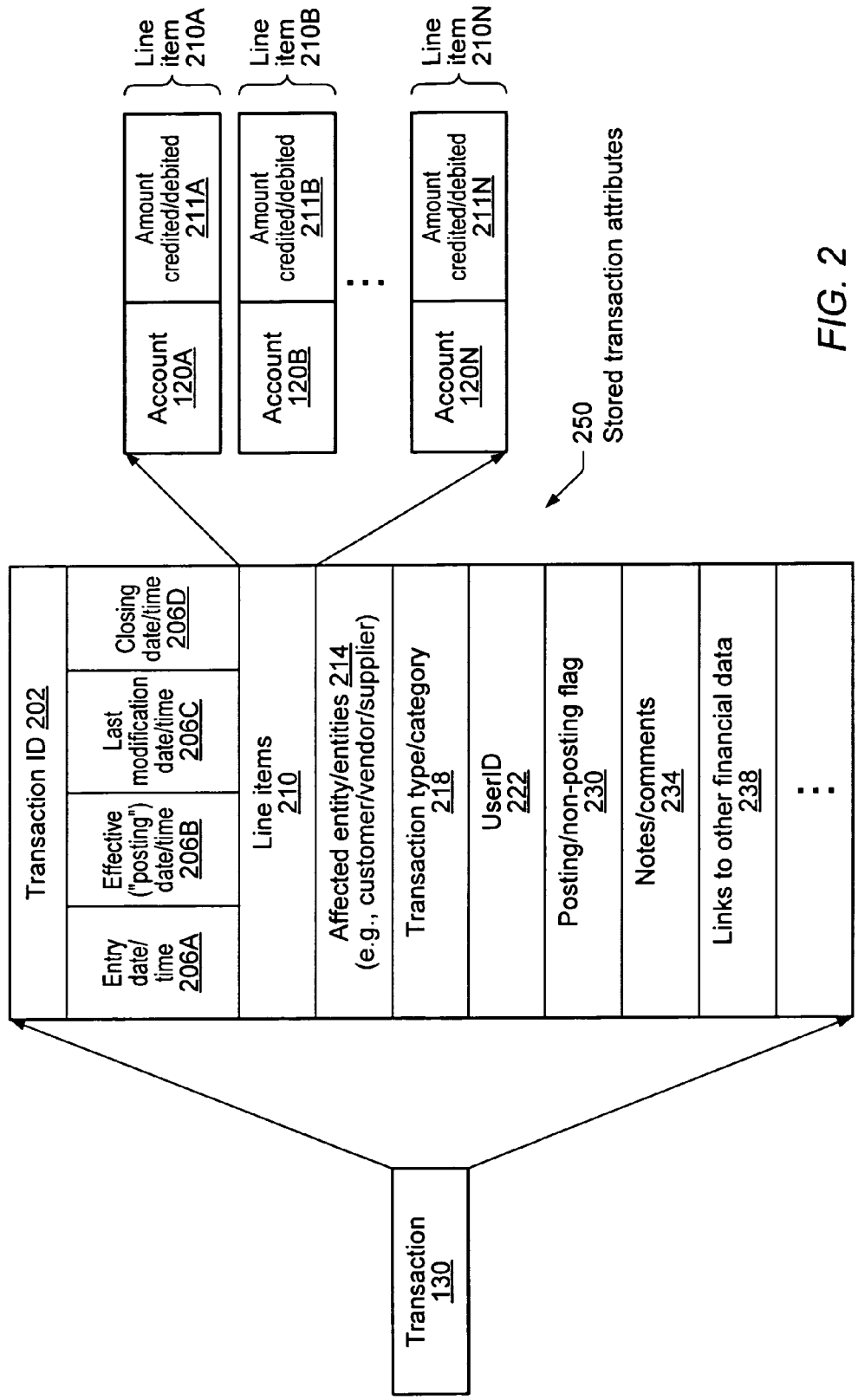
FIG. 2 illustrates an exemplary set of transaction attributes that may be stored as part of financial data, according to one embodiment.

In various embodiments, the accounting tool 110 may support a number of features in addition to those described above. In one embodiment, the accounting tool may be configured to distinguish between so-called "posting transactions" and "non-posting transactions" (e.g., by saving a posting indicator attribute with a transaction as shown in FIG. 2). A transaction 130 may be termed a "posting" transaction if it affects the content of financial statements or documents released outside the organization, e.g., either for disclosure to the general public or for disclosure to another organization such as a bank or a potential partner in a merger or acquisition. Transactions that do not affect the content of externally released financial statements (such as purchase orders or estimates) may be termed "non-posting" transactions. In one embodiment, the accounting tool may be configured to maintain distinct versions (such as the modified and previous versions described above) only for specific types of transactions such as posting transactions, and not for other types of transactions such as non-posting transactions. The nature or extent of a modification made to a transaction 130, and the nature of the financial documents derived from the transaction, may affect the response required from an accounting or auditing perspective in some embodiments. For example, a modification or set of modifications resulting in a change of less than ten dollars to an account balance of $10,000 may not be considered "material" and may not require republishing a financial document; in contrast, a change of $5,000 may be deemed to be a "material" change and may require republication of the financial document. In some implementations, accounting tool 110 may be configured to store an indication of materiality with respect to republication (e.g., as determined by a human expert or by as estimated by an automated expert system) for changes made to one or more transactions 130. E.g., the previous versions and/or the new versions of a set of transactions may be flagged to indicate that the change is considered material for legal/accounting purposes. In one embodiment, a given transaction 130 or a set of transactions may be "closed" multiple times (e.g., by marking the transactions as having been included in an accounting event for each closing). For example, a transaction 130 may first be closed when it is reconciled against a bank statement. Later, it may be closed again after an accountant performs a quarterly review. Still later, the same transaction 130 may be closed yet again after an audit is performed for that same quarter or for the entire year. In such an embodiment, each accounting event may be associated with a corresponding set of closed transactions for that event, and the set of transactions closed for a given accounting event may overlap at least in part with the sets of transactions closed for other accounting events. In some cases, when a given transaction is closed multiple times, the same version (e.g., the same underlying attribute values) of the transaction may be associated with each closing; in other cases, one or more attributes of the transaction may have changed between successive closings, so different versions of the transaction may correspond to different closings.

In some embodiments, the accounting tool 110 may provide a comprehensive set of versioning capabilities that apply not just to changes to transactions 130 (whether the transaction corresponds to a closed accounting period or not), but also to changes to other financial data such as the information 175 maintained on customers/vendors/suppliers and inventory records 178, and to links between various portions of the financial information (such as links between one account and another, links between different transactions, between a transaction and an account, or between transactions and customer/supplier/vendor information, employee information, or inventory records). Each change performed to the financial data may be tracked—e.g., a record of when the change was made, exactly what values were changed and who made the changes may be kept. Even changes to metadata maintained by the accounting tool 110, such as preferences or configuration settings, may be managed using versions in some embodiments—e.g., whenever a set of preferences for displaying information for an account 120 is modified, the previous version of the preferences may be saved and a new version may be created. In some implementations, where accounting tool 110 may be configured to store access rights or permissions (as described below in further detail), a change to a permission or access right may also result in a creation of a new version of an object representing the permission or access right. In embodiments where general-purpose versioning is implemented, the accounting tool 110 may, for example, allow an authorized user (such as an accountant, financial controller, auditor, or business owner) to generate reports detailing changes made during specified periods of time and affecting transactions corresponding to other specified periods of time. In one scenario, for example, a user may wish to review, in April 2006, any changes that are made during the month of January 2006 through March 2006, where the changes affected transactions representing financial operations performed during January 2005-December 2005.

In some embodiments, the accounting tool may support grouping of transactions, e.g., by associating a common label with a plurality of transactions 130 that are affected by a single operation or accounting event. Undo of operations such as individual transaction addition/deletion/modification, and/or undo of a group of modifications as a unit may be supported in one embodiment. Errors made in entering transaction information may be corrected in some implementations without having to use general journal entries to get correct accounting results. Accounting tool 110 may also support automated merges of specified subsets of transaction changes in one embodiment. In addition to responding to modification requests for existing transactions by saving a previous version and creating a new version, in some embodiments, accounting tool 110 may also be configured to respond to a deletion request by automatically saving a "deleted" version of a transaction; the deleted version may later be retrieved for inclusion within a view or a report by authorized users. The addition of a new transaction to a closed accounting period (or the change of a date associated with a transaction 130, where the change makes the transaction effective or "posted" during a closed accounting period) may also result in accounting tool 110 taking responsive action in some embodiments. For example, in one embodiment, the accounting tool 110 may be configured to generate a "closing date exception" (which may be provided to a user as a warning or an error message) whenever any transaction is added to a closed accounting period, deleted from a closed accounting period, or when a transaction of a closed accounting period is modified. In one embodiment, each object stored within the financial data 105 may have an associated version number: e.g., when an object such as a transaction 130 is first recorded, it may be assigned a version number "0" or "1", and any subsequent changes may result in a creation of a new logical and/or physical version and a new version number being assigned to the new version.

Accounting tool 110 may be configured to store a variety of attributes, some or all of which may be modifiable in response to authorized user requests, for each transaction 130. FIG. 2 illustrates an exemplary set of transaction attributes 250 that may be stored as part of financial data 105, according to one embodiment. As shown, transaction attributes 250 may include a transaction identifier 202, a number of date/time attributes 206 (e.g., date/time attributes 206A-206D), a plurality of line items 210 (e.g., line items 210A-210N), an affected entity 214 involved in the transaction (such as a customer, vendor, or supplier) a transaction type/category 218, a user identifier 222, a posting/non-posting flag 230, notes/comments 234, and links to other financial data 238 (such as other transactions or other accounts). The transaction identifier 202 may be a number or string that uniquely identifies the transaction within a set of transactions of a similar type (e.g., each invoice transaction may be associated with a different invoice number); in other implementations, the transaction identifier may be unique across all the types of transactions managed by the accounting tool 110 for the organization.

A plurality of entry date/time attributes may be maintained for each transaction 130 in some embodiments. It is noted that in different implementations, the granularity at which dates or times are recorded for events such as transaction entry may vary: e.g., in one implementation, only the date (year, month, and date of the month) may be recorded, while in another implementation, detailed timing information including the hour, minute or second when the event occurred may be recorded. An entry date/time attribute 206A may indicate when the transaction was initially recorded or entered. An effective or "posting" date/time attribute 206B may indicate a date or time when the financial operation or operations represented by the transaction may have been "posted", i.e., officially or legally completed. A last-modified date/time attribute 206C may indicate when the most recent modification was made to the transaction. In some embodiments, a separate closing date/time attribute 206D may be maintained, indicating when the transaction (or the accounting period in which the effective date of the transaction falls) was closed. Not all the different date/time attributes 206 may be maintained in every embodiment and/or for each transaction. For example, in one embodiment, closing date/time attributes 206D may not be maintained separately for each transaction; while in another embodiment, an entry date/time attribute 206A may not be maintained.

A given transaction 130 may comprise a plurality of line items 210A-210N in the embodiment shown in FIG. 2, where each line item 210 indicates a corresponding account 120 and an amount to be debited from or credited to that account. For example, line item 210A in FIG. 2 indicates the amount 211A to be debited/credited for account 120A, line item 211B indicates an amount 211B to be debited/credited for account 120B, and line item 211N indicates an amount to be debited/credited for account 120N. The total of the different debit/credit amounts 211 for a given transaction may be required to be zero in some embodiments—i.e., the sum of the credit amounts for a transaction must equal the sum of the debit accounts for that transaction in such embodiments. The amounts 211 may be expressed in any appropriate currency and/or format, as indicated for example in account preferences or global preferences maintained by accounting tool 110. In some implementations, one or more transactions 130 may each include only one line item 210. The affected entity field 214 may identify an individual or organization (e.g., a customer/vendor/supplier) affected by the transaction, such as entity to whom a check is directed or from whom a check is received. Category/type attribute 218 may be used to classify transactions into related groups based on the business needs of the organization. User identifier 222 may indicate the user that last modified the transaction 130. A posting/non-posting flag 230 may indicate whether the transaction affects externally published financial statements or documents. Notes/comments 234 may be used to store any desired information entered for the transaction by a user. Links 238 may represent relationships between different portions of financial data 105: e.g., an invoice transaction may be linked to one or more later payment transactions to indicate payments corresponding to the invoice. In some embodiments, some of the attributes shown at the transaction level in FIG. 2 may instead or in addition be maintained at a per line item level: e.g., one or more line items 210 may include notes or comments, affected entity information, or category/type information. Information not shown in FIG. 2 at either the transaction level or the line item level, such as inventory-related quantity information, may be stored per line item and/or per transaction in other embodiments. Not all the attributes 250 shown in FIG. 2 may be stored for each transaction in some embodiments, and additional attributes beyond those illustrated in FIG. 2 (such as a current version number) may be included in other embodiments. In addition, not all the attributes 250 of a given transaction may be visible and/or modifiable via transaction view/edit interface 150 in some embodiments; e.g., accounting tool 110 may be configured to maintain some of the attributes as part of internal data structures that are hidden to most (or all) users of the accounting tool 110. In one embodiment, when a new version of a transaction 130 is created, accounting tool 110 may be configured to save only the changed attributes 250 in the new version, together with a pointer to the previous version, e.g., for space efficiency. In other embodiments, each stored version of a transaction may include the latest available versions of each attribute 250, which may enhance the performance of retrievals of the attributes of any particular version, but may require more memory space. In one embodiment, the latest version of a transaction may include all the attribute values, while each previous version may include only the old versions of those attributes 250 that were modified in the version that immediately succeeded that previous version.

In one embodiment, accounting tool 110 may be configured to implement an access control policy to ensure that only authorized users are able to perform various actions on transactions 130 and/or accounts 120—e.g., accounts and/or specific transactions may be password-protected for viewing or updating. Different access rights may be required to modify a transaction 130 if the transaction corresponds to a closed accounting period than if the transaction corresponds to a current or not-yet-closed accounting period in some implementations. For example, default access rights may be sufficient to modify one or more attributes of a transaction 130B of a current accounting period, while additional access rights and/or a password may be required to modify transactions 130A of a closed accounting period. Similarly, if a transaction 130A corresponding to a closed accounting period is modified, in one embodiment, a different set of access rights (and/or a password) may be required to view the unmodified version of the transaction than the access rights required to view the modified version. For example, accountants or supervisors within an organization may be allowed to view the previous version of a transaction 130A that was modified after the accounting period in which the transaction was initially recorded is closed, e.g., to determine whether the change was significant enough to require a re-filing of financial documents outside the organization. Other employees of the organization may not be given sufficient access rights to view the previous version, and may only be allowed to view the current, changed version of the transaction 130A. The accounting tool 110 may be configured to store access rights information in various formats (e.g., as read/write/modify bits or codes, access control lists (ACLs), roles, capabilities) for various accounts, transactions and/or users in different embodiments. Prior to providing access to a transaction 130 or account 120, the accounting tool 110 may be configured to verify that the user accessing the set has the appropriate access rights. In some embodiments, access permissions or rights may be associated separately with each attribute 250, or with different groups of attributes 250. For example, one set of access rights may be required to modify the amount 210, while a different set of access rights may be needed for modifying the name of an affected entity such as a customer or vendor 214. The accounting tool 110 may also disallow modification of some attributes: e.g., modification of entry date/time attribute 206A and/or last modification date/time attribute 206C may not be permitted in some embodiments.

Figure 3:
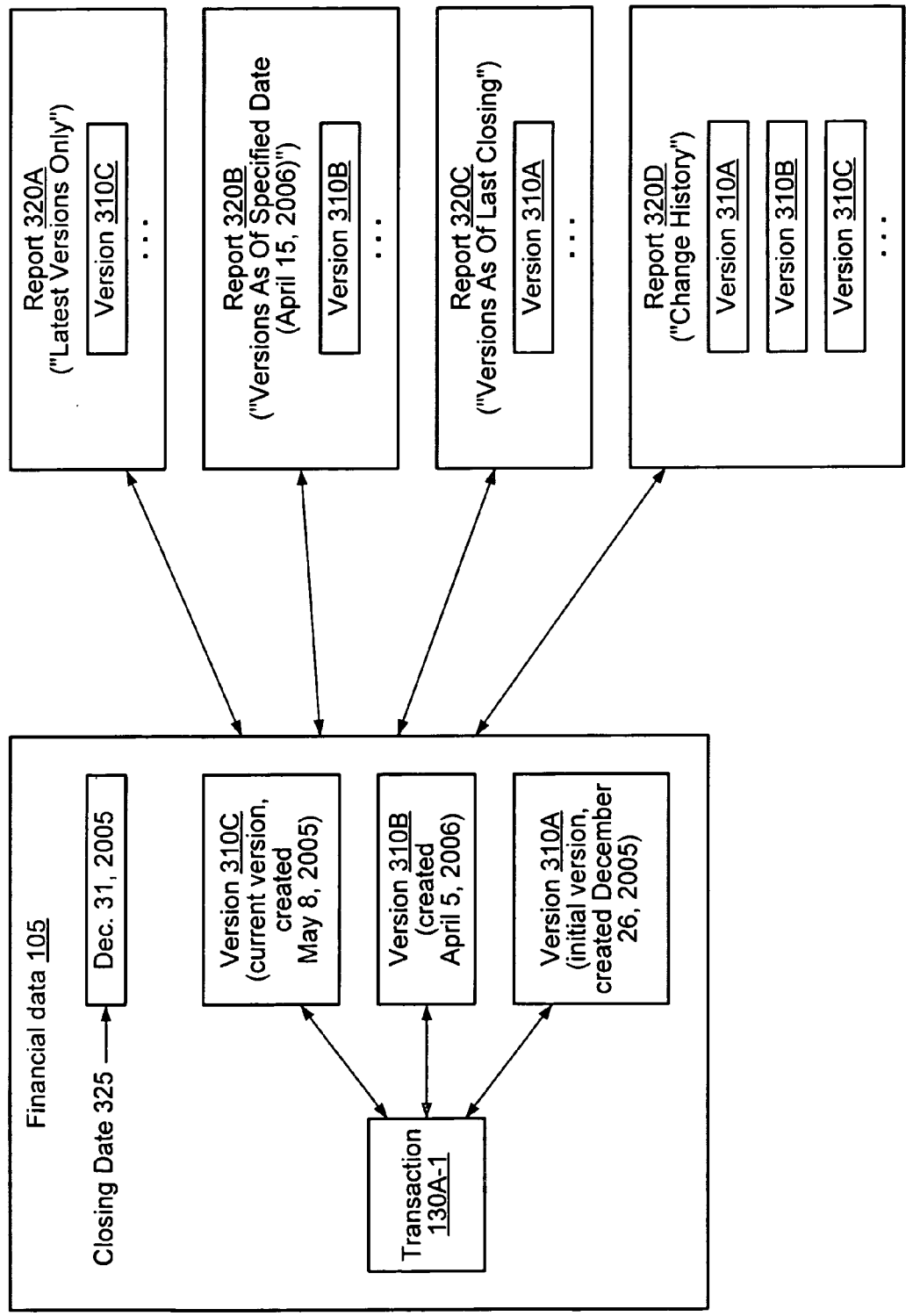
FIG. 3 illustrates three versions of a transaction generated by an accounting tool, according to one embodiment.

In some embodiments, as noted above, the accounting tool 110 may be configured to track each change to a transaction 130 by generating a new version of the transaction—e.g., by storing a record that indicates a time or date when the change is made, the user that made the change, and the changed attribute value or values. FIG. 3 illustrates an exemplary scenario in which three versions 310A-310C of a transaction 130A-1 are generated by accounting tool 110, according to one embodiment. In the illustrated example, an initial version 310A of transaction 130A-1 was created on Dec. 26, 2005. The accounting period was closed on Dec. 31, 2005, as indicated by closing date 325. Subsequently, transaction 130A-1 was modified on Apr. 5, 2006 and again on May 8, 2006, resulting in the creation of versions 310B and 310C respectively. A variety of different types of reports may be generated using reporting interface 155 of accounting tool 110 in the depicted embodiment. Each type of report may correspond to a different user-specified reporting mode (or a default reporting mode), and may provide a different view of the versions of modified transactions such as transaction 130A-1. For example, reporting interface 155 may allow a user to specify whether a report is to include only the latest versions of transactions 130 that were originally recorded during a specified reporting period, whether the versions as of a particular date/time are to be included, whether versions corresponding to specified accounting events such as an audit or a closing are to be included, or whether all the versions corresponding to various changes during a specified period are to be included. In another embodiment a user may specify a "forward changes" reporting mode, in which a change made to a transaction is to be reported during a reporting period when the change was made, rather than in a reporting period in which the transaction was initially recorded or posted. In one example scenario of "forward change" reporting, a transaction indicating a transfer of $200 between two accounts may be posted (i.e., may have an effective date of) Dec. 15, 2005. The closing date may be set to Dec. 21, 2005. On Jan. 22, 2006, the amount indicated in the transaction may be modified to $250, while keeping the effective date unchanged at Dec. 15, 2005. A report generated using "forward change" reporting mode would indicate a transaction showing a $50 transfer posted on Jan. 22, 2006, representing the change made on January 22, even though the user making the change on Jan. 22, 2006 may have modified the December 15 transaction in place, without entering a new transaction. Thus, forward change reporting may indicate the effects of user changes as though the changes were performed using compensating transactions rather than in-place editing. As a result, while users may still avoid the extra effort required for entering compensating transactions, the forward change reporting mechanism may generate reports that adhere to conventional accounting requirements that may prevent modifications to transactions posted in a closed accounting period. In the scenario depicted in FIG. 3, a user has indicated that report 320A is to include only the latest available versions of transactions, and thus report 320A includes version 310C of transaction 130A-1 (and excludes versions 310B and 310C). In some embodiments, when a report is requested without indicating a report type or without specifying which versions of modified transactions 130 are to be included, a default report type may be used, e.g., only the latest versions of transactions 130 may be included.

For report 320B shown in FIG. 3, a user has indicated that versions of transactions as of a specified date (Apr. 15, 2005) be included. Accordingly, version 310B of transaction 130A-1, which was created on Apr. 5, 2006 and was therefore the latest version as of the specified date, is included in report 320B, while versions 310A and 310C are excluded. For report 320C, a user has indicated that the versions of transactions corresponding to the last closing be included, and as a result, version 310A is included, while versions 310B and 310C are excluded. In the case of report 320D, the entire change history for the transaction 130A-1 has been requested, and as a result, versions 310A, 310B and 310C are all included in the report. Different access rights may be required for the different report types in some embodiments. It is noted that in some implementations, authorized users may be permitted to purge old versions of transactions, old accounting event information, or other financial data—e.g., if a transaction is changed several times, only records of the most recent two or three changes, or the changes made within a specified period of time before the current time, may need to be retained, and earlier records or versions may be purged together with corresponding accounting event information to save memory and/or disk space. In one embodiment, as long as a record of an accounting event is retained, the corresponding transaction versions may have to be retained as well, e.g., in order to support reporting that is based on specified accounting events.

Figure 4:
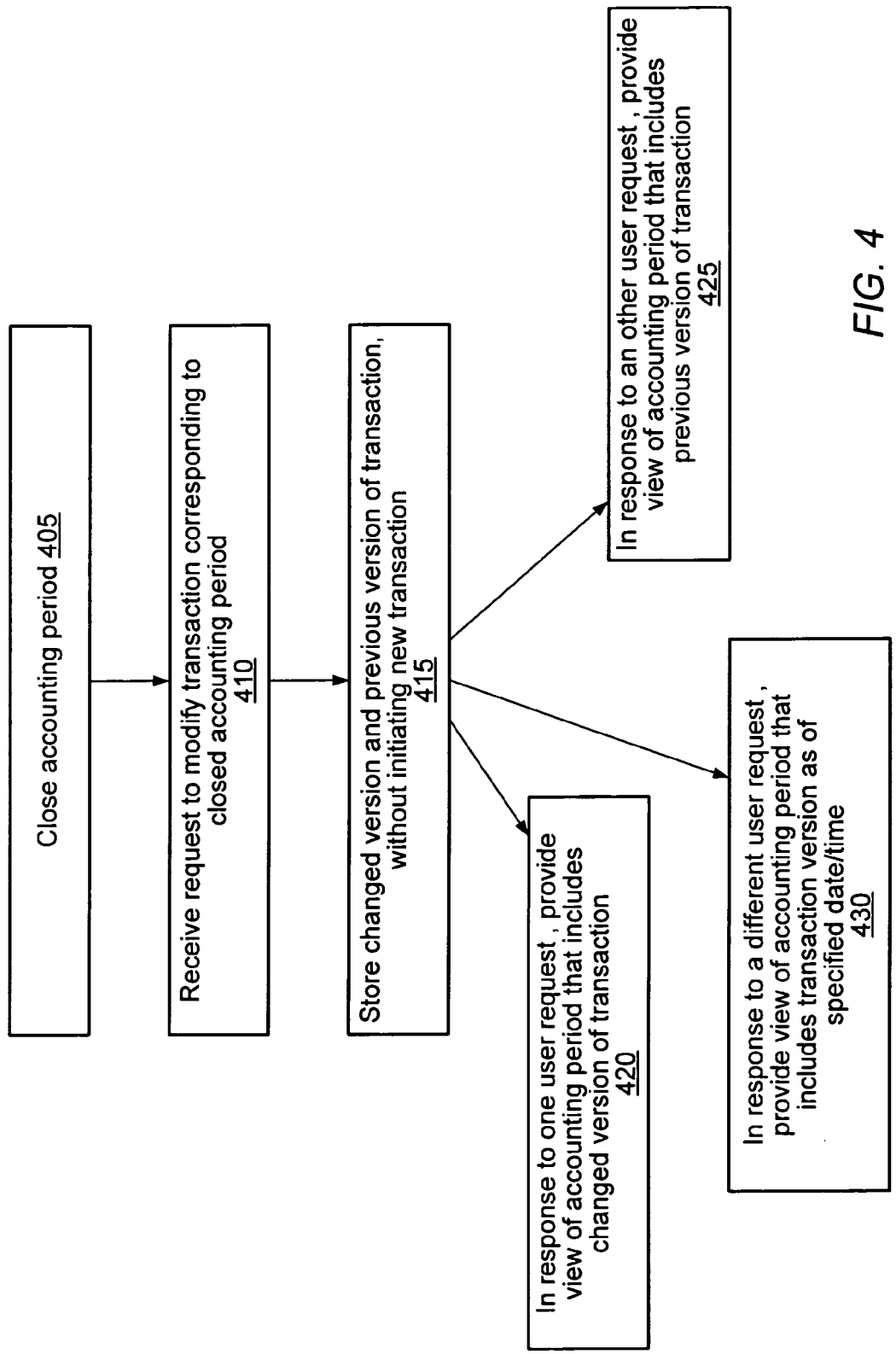
FIG. 4 is a flow diagram illustrating aspects of the operation of an accounting tool, according to one embodiment.

FIG. 4 is a flow diagram illustrating aspects of the operation of accounting tool 110, according to one embodiment. As shown in block 405, the accounting tool 110 may be configured to close an accounting period, e.g., in response to a request from a user specifying a closing date. In some embodiments, a user may also specify a password associated with closing an accounting period; in such embodiments, any changes made to transactions with posting dates earlier than the closing date may require that the password be provided. Other authentication and/or authorization techniques may be implemented in different embodiments to protect the data corresponding to closed accounting periods. After the accounting period has been closed, the accounting tool may receive a request to modify a transaction 130A corresponding to the closed accounting period (e.g., a transaction that has a posting or effective date before the closing date), as shown in block 410. For example, if the original version of the transaction indicated that a check for $20 was received from a customer, and a user of the accounting tool determines that the check was actually for $18 after the accounting period has closed, the user may modify the amount indicated in the transaction. The accounting tool 110 may be configured to store both a previous version (indicating in the current example that the check was for $20) and a changed version (indicating that the check was for $18) of the transaction (block 415). In addition, the accounting tool 110 may also be configured to provide a number of different views of the closed accounting period. One view, in response to a particular user request, may include the changed version of the transaction 130A, as shown in block 420; another view, in response to a different user request, may include the previous version of the transaction 130A as shown in block 425. Yet another view, as indicated in block 430, may include a version of the transaction 130A as of a specified date; either the changed version or the previous version may be included in such a view, depending on the date specified by the user.

Figure 5:
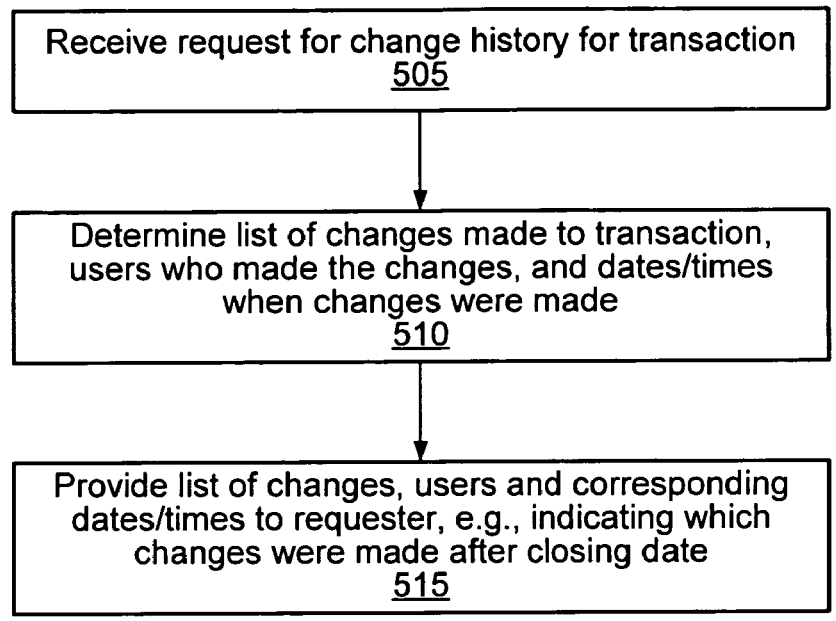
FIG. 5 is a flow diagram illustrating further aspects of the operation of accounting tool, according to one embodiment in which respective versions corresponding to each change made to a transaction are maintained by accounting tool.

FIG. 5 is a flow diagram illustrating further aspects of the operation of accounting tool 110, according to one embodiment in which respective versions corresponding to each change made to a transaction 130A are maintained by accounting tool 110. As shown in block 505, the accounting tool may receive a request for a change history of the transaction 130A. For example, during an audit in which a value of a particular transaction attribute is determined to be suspect, an auditor may wish to identify all the changes that have been made to the transaction, who made the changes and when the changes were made. In response to the change history request, the accounting tool may be configured to determine, e.g., by searching within a database of versions, or by traversing a linked list of versions for the transaction 130A, a list of the changes that have been made to the transaction (block 510). The accounting tool 110 may then provide the list of changes, e.g., including the values of the attributes 250 modified during each change, an identification of the user who performed each change, and the time or date when each change was made (block 515). In some embodiments, if changes were made to the transaction 130A-1 both before and after the accounting period was closed, the accounting tool 110 may be configured to indicate which of the changes were made after closing (e.g., by highlighting information for such changes on a display). In one embodiment, the request may indicate a start date and an end date for the change history, e.g., a user may request a list of changes made to a transaction between Jul. 1, 2004 and Jun. 30, 2005. In other embodiments, or when no specific start and end dates are specified, the accounting tool 110 may provide a complete change history, listing all the changes recorded for the transaction. In some implementations, change history query capabilities may be provided as part of the functionality of diagnostics facility 160, e.g., the diagnostics facility may be configured to provide access to various versions (including versions modified before and after a closing date) of a transaction to help determine whether an accounting error has occurred.

Figure 6:
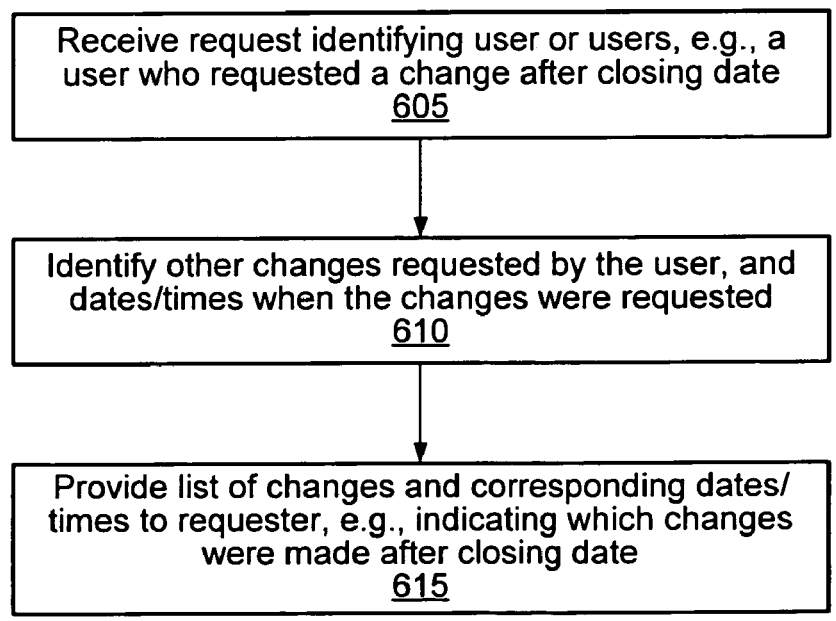
FIG. 6 is a flow diagram illustrating aspects of the operation of an accounting tool in one embodiment where the accounting tool is configured to support based on specified values or sets of values of transaction attributes.

FIG. 6 is a flow diagram illustrating aspects of the operation of the accounting tool 110 in one embodiment where the accounting tool 110 is configured to support queries based on specified values or sets of values of transaction attributes 250. The accounting tool may receive a request identifying a particular user (block 605) or a group of users. For example, an auditor or an accountant may have determined that a user has modified a transaction 130A after the accounting period in which the transaction was recorded has been closed, and may wish to investigate any other changes made by that user. In response to the request, the accounting tool 110 may be configured to identify a list of changes made by the identified user or users (which may have affected multiple transactions 130 and/or multiple accounts 120) and the dates/times when the changes were made (block 610), and provide the list of changes to the requester. As shown in block 615, the list of changes may include the dates/times when the changes were requested or made. In some implementations, indications of which of the changes were made after a closing date may also be provided, e.g., by highlighting the information corresponding to such changes on a display. Queries based on other transaction attributes (such as affected entities 214, transaction category 218, last modification time 225, notes/comments 234 and/or or links 238) may also be supported in some embodiments. In some implementations, accounting tool 110 may be configured to support queries for any desired combination of attributes, e.g., queries logically equivalent to "Show me transactions belonging to category "software" that were last modified between Jan. 1, 2006 and Jan. 31, 2006". In one embodiment, an accountant or other user may be concerned about a specific amount by which a transaction may have been modified: e.g., the accountant may suspect that an inappropriate change of $1200 may have been made an amount initially recorded in a transaction. The accounting tool 110 may be configured to support querying for specific amount changes or ranges of amount changes, e.g., to respond to a query logically equivalent to "Show me the list of transaction changes that modified an amount by between $1100 and $1300".

Figure 7:
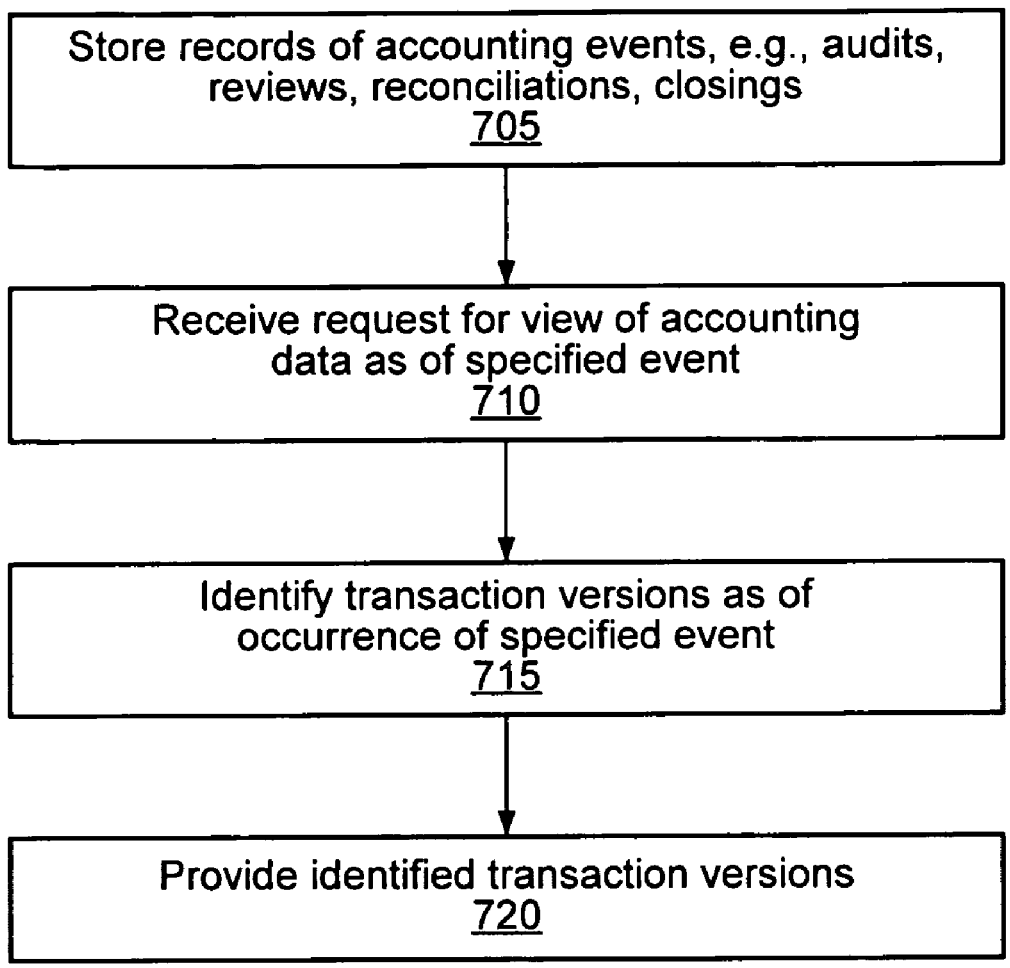
FIG. 7 illustrates aspects of the operation of an accounting tool according to an embodiment where queries based on specified accounting events are supported.

In addition to storing account information, various versions of transactions 130 and information indicating when accounting periods were closed, as noted above, the accounting tool may also be configured to store records of other types of accounting events, such as audits, reviews, or reconciliations in some embodiments. A reconciliation event may comprise, for example, evaluating a set of reports (e.g., generated via reporting interface 155) using records of the corresponding transactions 130, to ensure that the reports are accurate and that there are no discrepancies between the reports and the underlying transaction records. A reconciliation may be considered a special case of a review in some embodiments—for example, a review may involve several accounts, while a reconciliation may only apply to one account at a time. Some types of accounting events may include non-automated analysis (e.g., performed by accountants or auditors). FIG. 7 illustrates aspects of the operation of accounting tool 110 according to an embodiment where queries based on specified accounting events are supported. As shown in block 705, the accounting tool may store respective records for a variety of different accounting events, e.g., within accounting events history 164 of FIG. 1. The records may include date/time information indicating when the events occurred. In some implementations, the accounting tool 110 may be configured to use labels to distinguish between versions of transactions corresponding to different accounting actions: for example, transactions 130 that have been examined for an audit on a particular date may be labeled as having been audited on a specific date. The accounting tool 110 may receive a request for a view of the accounting data as of a particular accounting event (block 710). In response, the accounting tool 110 may identify a set of transaction versions as of the time that the particular accounting event occurred (block 715) and provide the set to the requester (block 720). It is noted that not all users of accounting tool 110 may be allowed to obtain the types of views indicated in FIG. 5, FIG. 6 and or FIG. 7 in some embodiments: e.g., special access rights or permissions may be required to view transaction change histories, lists of transaction versions modified by a specified user, and/or transaction versions corresponding to specified accounting events. It is also noted that in some cases a user may wish to examine changes that may have been made after a particular accounting event took place. For example, a reconciliation for a bank account may comprise comparing a statement received from a bank with the organization's own records of its banking transactions in one implementation. At the end of such a reconciliation, the transactions 130 corresponding to the bank statement may be considered closed (and in some embodiments where transaction-level closing is supported, the transactions corresponding to the bank account may be formally closed). An authorized user may wish to use reporting capabilities of accounting tool 120 to identify any changes made after such a closing to any of the transactions corresponding to the bank statement.

Figure 8:
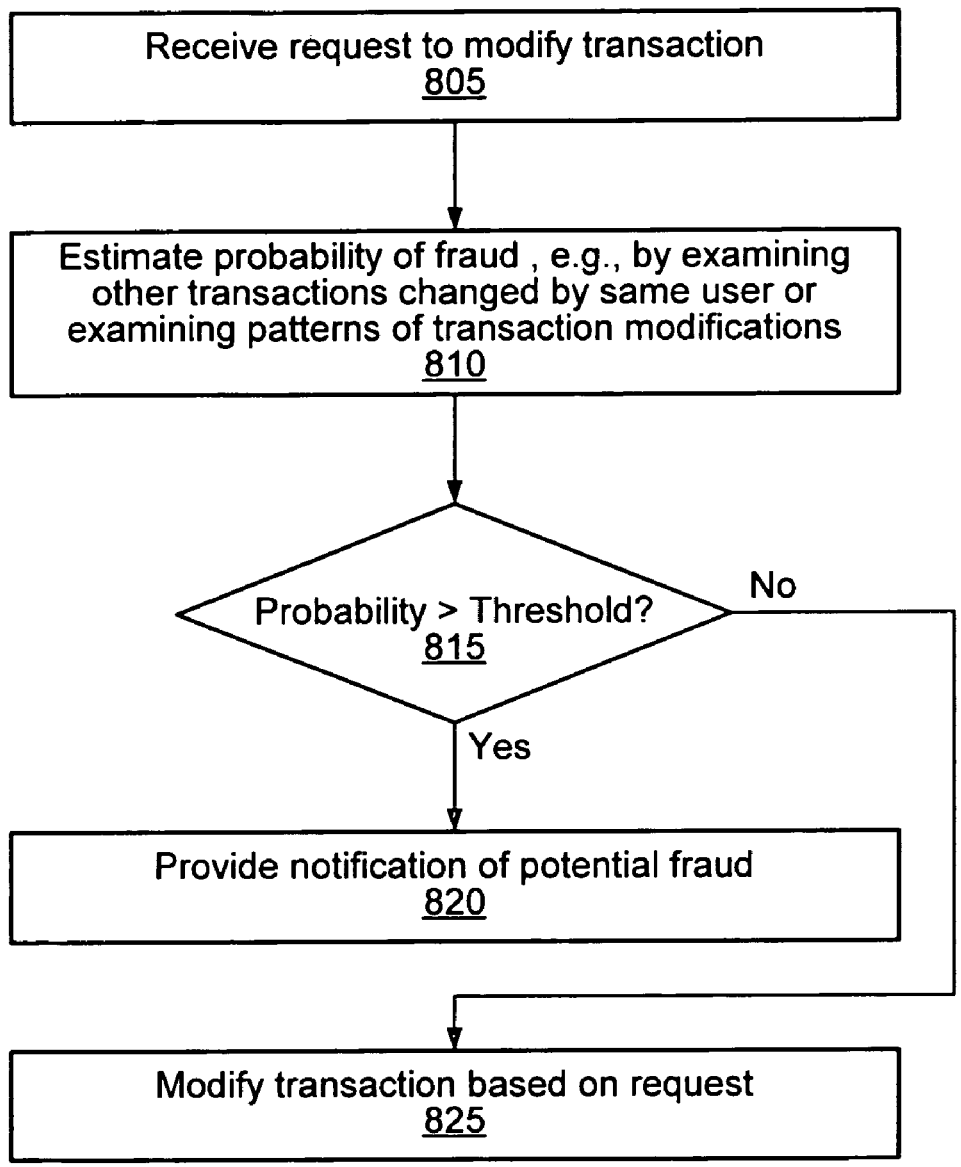
FIG. 8 illustrates aspects of the operation of an accounting tool comprising a fraud detector, according to one embodiment.

In one embodiment, accounting tool 110 may include a fraud detector 162. FIG. 8 illustrates aspects of the operation of accounting tool 110 according to one such embodiment. In response to a request to modify a transaction 130 (block 805), in such an embodiment the accounting tool 110 may be configured to estimate a probability that the request is part of a fraudulent operation (block 810). In general, a fraudulent operation may include one or more transactions by one user or a group of users, and the fraud detector 162 may be configured in some implementations to analyze patterns of user behavior with the help of transaction version information to detect relationships between the transactions as well as the likelihood of fraud. The fraud detector 162 may be configured to use a variety of rules and/or heuristics to estimate the probability; e.g., in one embodiment, the fraud detector may be configured to identify specific types of potentially suspicious operations based on such rules, such as a change of more than 50% to an amount specified in a transaction, or a large number of changes made by a single user within a short period of time. In one embodiment, a change to a transaction 130A of a closed accounting period may automatically be flagged as a potentially fraudulent operation, and fraud detector 162 may be configured to perform additional operations (such as examining other transactions modified by the same user that requests the modification after closing) to check for other indications of fraud. If the probability of fraud is determined to be higher than a threshold (as detected in decision block 815), the accounting tool 110 may be configured to provide a notification of potential fraud to one or more recipients (such as a designated auditor) (block 820). If the probability is found to be lower than the threshold (as also detected in block 815), the accounting tool 110 may modify the transaction as requested (block 825), and may store a changed version and an unchanged version of the transaction as described above.

Figure 9:
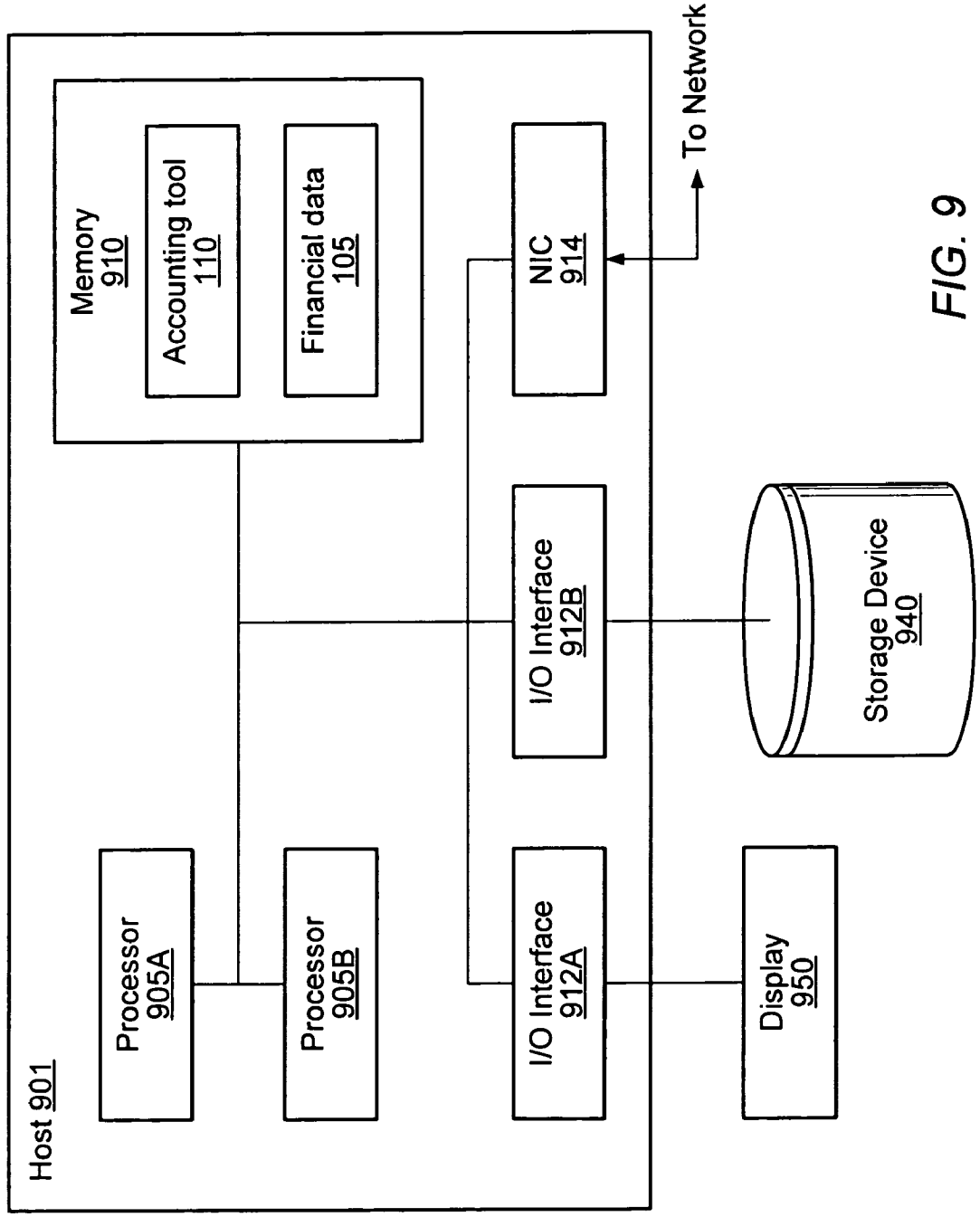
FIG. 9 is a block diagram illustrating constituent elements of a computer host at which at least a portion of an accounting tool may be executed, according to one embodiment.

FIG. 9 is a block diagram illustrating constituent elements of a computer host 901 at which at least a portion of accounting tool 110 may be executed, according to one embodiment. Host 901 may include one or more processors (e.g., processor 905A and processor 905B) implemented using any desired architecture or chip set, such as the SPARC™ architecture, an x86-compatible architecture from Intel Corporation, Advanced Micro Devices, or an other architecture or chip set capable of processing data. Any desired operating system may be run on the host 901, such as various versions of Unix, Linux, Windows™ from Microsoft Corporation, MacOS from Apple Corporation, or any other operating system that enables the operation of software on a hardware platform. Program instructions that may be executable to implement the functionality of accounting tool 110 may be partly or fully resident, together with part or all of financial data 105, within a memory 910 at the host 901 at any given point in time, and may also be stored on a storage device 940 such as a disk or disk array accessible from the processors. In various embodiments, accounting tool 110 may be packaged as a standalone application, or may be packaged along with a suite of other software tools. The memory 910 used to store the program instructions may be implemented using any appropriate medium such as any of various types of RAM (e.g., DRAM, SDRAM, RDRAM, or SRAM). In addition to processors and memory, the host 901 may also include one or more I/O interfaces 912 (such as I/O interface 912A providing access to a display 950 and I/O interface 912B providing access to storage devices 940), and one or more network interfaces (such as network interface card (NIC) 914) providing access to a network. Any of a variety of storage devices 940 may be used to store the program instructions as well as application data in different embodiments, including any desired type of persistent and/or volatile storage devices, such as individual disks, disk arrays, optical devices such as CD-ROMs, CD-RW drives, DVD-ROMs, DVD-RW drives, flash memory devices, various types of RAM, holographic storage and the like. It should be noted that one or more components of host 901 may be located remotely and accessed via a network. In some embodiments, the functionality of accounting tool 110 may be distributed across multiple computer hosts, e.g., in a cluster configuration. In one embodiment, financial data 105 may be distributed among a plurality of hosts 901. A mobile computing device such as a personal digital assistant (PDA) or an advanced mobile phone may incorporate some or all of the functionality of accounting tool 110 in one embodiment.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a processor;
a memory;
a fraud detector tool residing in the memory, executing on the processor, and comprising functionality to:
calculate a modification percentage based on a transaction amount and a modified transaction amount;
identify a plurality of historical transaction modifications of a user;
calculate, based on the modification percentage and the plurality of historical transaction modifications, a probability of fraud; and
determine that the probability of fraud is less than a predefined threshold; and
an accounting tool residing in the memory, executing on the processor, and comprising functionality to:
identify, among a plurality of transactions corresponding to a closed accounting period, a transaction comprising the transaction amount;
receive, from a user, a request to modify the transaction with the modified transaction amount;
create, in response to determining that the probability of fraud is less than the predefined threshold, a changed version of the transaction comprising the modified transaction amount according to the request to modify, and maintain a previous version of the transaction not modified according to the request to modify;
receive a selection of a report type for a report indicative of the closed accounting period from among a plurality of report types, wherein the plurality of report types comprises:
a first report type indicating that a last modified version of each of the plurality of transactions including the changed version is included in the report and a previously modified version of each of the plurality of transactions including the previous version is excluded from the report,
a second report type indicating that a version of the plurality of transactions as of a specified time is included in the report, and
a third report type indicating that the last modified version of each of the plurality of transactions including the changed version and the previously modified version of each of the plurality of transactions including the previous version are included in the report; and
generate, based on the selection, the report in accordance with the report type.

2. The system of claim 1, wherein the accounting tool is further configured to:
provide, in response to a change history request for the transaction, at least the previous version, the changed version, and an indication of a time at which the changed version was created.

3. The system of claim 1, wherein the accounting tool is further configured to provide a diagnostic facility to detect accounting errors, wherein the diagnostic facility is configured to access the changed version and the previous version to detect whether an accounting error has occurred.

4. A computer-readable storage medium, comprising a plurality of program instructions for financial reporting, wherein the plurality of program instructions are computer-executable to:
identify, among a plurality of transactions corresponding to a closed accounting period, a transaction comprising a transaction amount;
receive, from a user, a request to modify the transaction with a modified transaction amount;
calculate a modification percentage based on the transaction amount and the modified transaction amount;
identify a plurality of historical transaction modifications of the user;
calculate, based on the modification percentage and the plurality of historical transaction modifications, a probability of fraud;
determine that the probability of fraud is less than a predefined threshold;
create, in response to determining that the probability of fraud is less than the predefined threshold, a changed version of the transaction comprising the modified transaction amount according to the request to modify, and maintain a previous version of the transaction not modified according to the request to modify;
receive a selection of a report type for a report indicative of the closed accounting period from among a plurality of report types, wherein the plurality of report types comprises:
a first report type indicating that a last modified version of each of the plurality of transactions including the changed version is included in the report and a previously modified version of each of the plurality of transactions including the previous version is excluded from the report, a second report type indicating that a version of the transaction plurality of transactions as of a specified time is included in the report, and a third report type indicating that the last modified version of each of the plurality of transactions including the changed version and the previously modified version of each of the plurality of transactions including the previous version are included in the report; and generate, based on the selection, the report in accordance with the report type.

5. The computer-readable storage medium of claim 4, wherein the plurality of program instructions are further computer-executable to:

provide, in response to a change history request for the transaction, at least the previous version, the changed version, and an indication of a time at which the changed version was created.

6. The computer-readable storage medium of claim 4, wherein the plurality of program instructions are further computer-executable to: provide a diagnostic facility to detect accounting errors, wherein the diagnostic facility is configured to access the changed version and the previous version to detect whether an accounting error has occurred.

7. A computer-implemented method of financial reporting, comprising:

identifying, among a plurality of transactions corresponding to a closed accounting period, a transaction comprising a transaction amount;

receiving, from a user, a request to modify the transaction with a modified transaction amount;

calculating, by a computer processor, a modification percentage based on the transaction amount and the modified transaction amount;

identifying a plurality of historical transaction modifications of the user;

calculating, by the computer processor and based on the modification percentage and the plurality of historical transaction modifications, a probability of fraud;

determining that the probability of fraud is less than a predefined threshold;

creating, in response to determining that the probability of fraud is less than the predefined threshold, a changed version of the transaction comprising the modified transaction amount according to the request to modify, and maintaining a previous version of the transaction not modified according to the request to modify;

receiving a selection of a report type for a report indicative of the closed accounting period from among a plurality of report types, wherein the plurality of report types comprises:

a first report type indicating that a last modified version of each of the plurality of transactions including the changed version is included in the report and a previously modified version of each of the plurality of transactions including the previous version is excluded from the report, a second report type indicating that a version of the plurality of transactions as of a specified time is included in the report, and a third report type indicating that the last modified version of each of the plurality of transactions including the changed version and the previously modified version of each of the plurality of transactions including the previous version are included in the report; and generating, by the computer processor and based on the selection, the report in accordance with the report type.

8. The computer-implemented method of claim 7, further comprising:

providing, in response to a change history request for the transaction, at least the previous version, the changed version, and an indication of a time at which the changed version was created.

9. The computer-implemented method of claim 7, further comprising:

detecting whether an accounting error has occurred, wherein said detecting comprises accessing the changed version and the previous version.

10. The system of claim 1, wherein the accounting tool is further configured to:

store a plurality of access rights of a plurality of users of the accounting tool, wherein the user is among the plurality of users; and verify, prior to providing the report to the user and based on the plurality of access rights, that the user is authorized to execute the report.

11. The system of claim 1, wherein the accounting tool is further configured to:

store a plurality of records indicating a plurality of accounting events including a reconciliation, a review, a closing, and an audit, wherein each of the plurality of records indicates a time at which a corresponding accounting event of the plurality of accounting events occurred;

identify a record of the plurality of records indicating when the closed accounting period was closed; and provide a new report in response to a request specifying an accounting event of the plurality of accounting events.

12. The computer-readable storage medium of claim 4, wherein the plurality of program instructions are further computer-executable to:

store a plurality of access rights of a plurality of users of the accounting tool, wherein the user is among the plurality of users; and verify, prior to providing the report to the user and based on the plurality of access rights, that the user is authorized to execute the report.

13. The computer-readable storage medium of claim 4, wherein the plurality of program instructions are further computer-executable to:

store a plurality of records indicating a plurality of accounting events including a reconciliation, a review, a closing, and an audit, wherein each of the plurality of records indicates a time at which a corresponding accounting event of the plurality of accounting events occurred;

identify a record of the plurality of records indicating when the closed accounting period was closed; and provide a new report in response to a request specifying an accounting event of the plurality of accounting events.

14. The computer-implemented method of claim 7, further comprising:

storing a plurality of access rights of a plurality of users of the accounting tool, wherein the user is among the plurality of users; and verifying, prior to providing the report to the user and based on the plurality of access rights, that the user is authorized to execute the report.

15. The computer-implemented method of claim 7, further comprising:

storing a plurality of records indicating a plurality of accounting events including a reconciliation, a review, a closing, and an audit, wherein each of the plurality of records indicates a time at which a corresponding accounting event of the plurality of accounting events occurred;

identifying a record of the plurality of records indicating when the closed accounting period was closed; and providing a new report in response to a request specifying an accounting event of the plurality of accounting events.

* * * * *